United States Patent Office

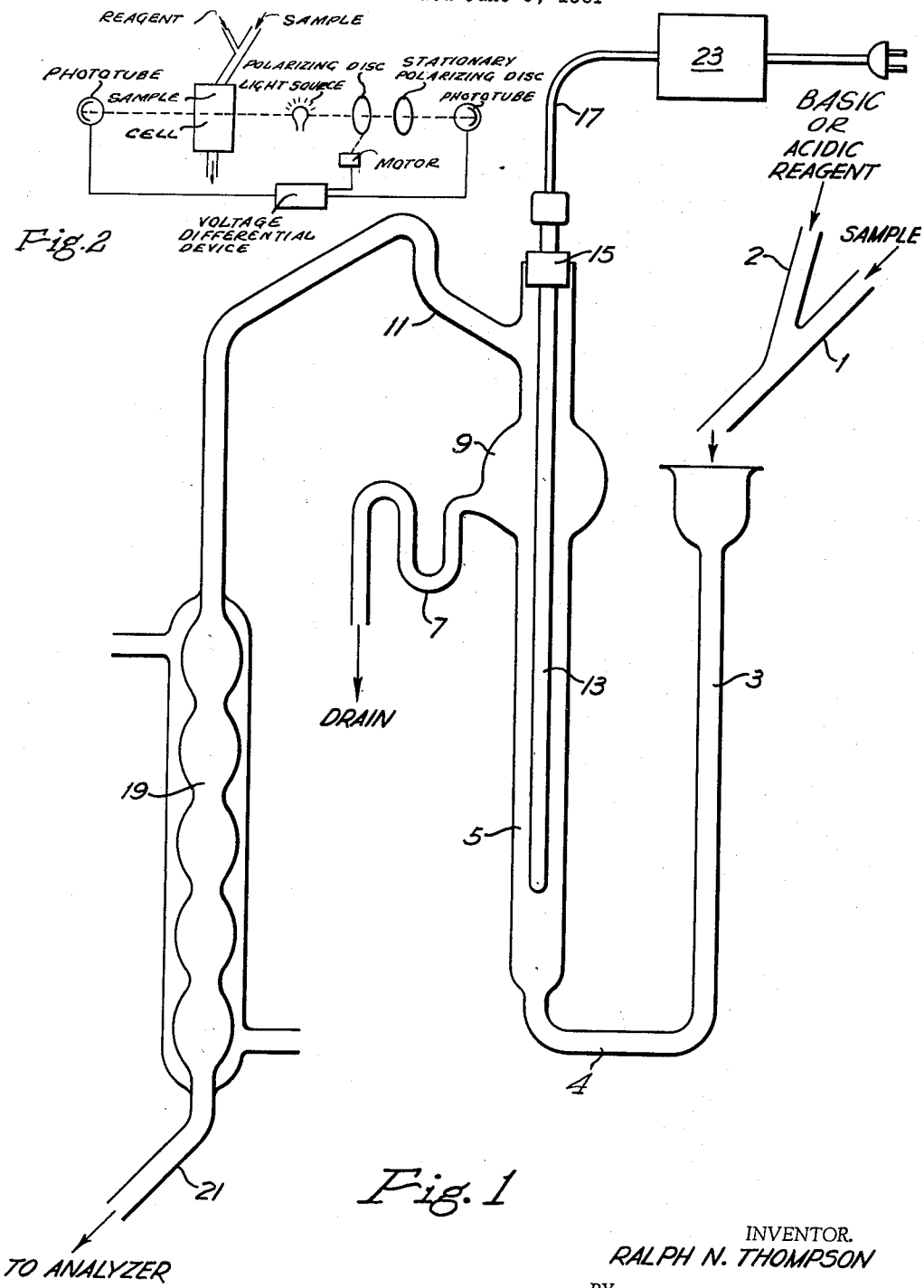

3,147,082
Patented Sept. 1, 1964

3,147,082
CONTINUOUS SAMPLE PREPARATION FOR
CHEMICAL ANALYSIS
Ralph N. Thompson, Mount Lebanon, Pa., assignor to
Calgon Corporation, a corporation of Pennsylvania
Filed June 5, 1961, Ser. No. 114,976
1 Claim. (Cl. 23—230)

This invention relates to apparatus and methods for preparing for accurate analysis a continuous sample of an aqueous or other liquid medium containing volatile substances which ordinarily are not accurately analyzable because of the presence of interfering substances.

Prior to the present invention, there was no known method of automatically, continuously, and accurately analyzing a flowing sample for content of such volatile substances as phenols, cyanides, fluorides, nitrogen, and ammonia. See, for example, the statement at page 945 of the monograph "Automatic Chemical Analysis," published by the New York Academy of Sciences in July 1960. The difficulty is that virtually all known methods of analyzing for these materials without distillation are subject to large and erratic errors introduced through the presence of interfering substances in the sample. As is well known to workers in this field, "interfering substances" are those which hamper the desired analytical determination by combining with the reagent, the substance under analysis, or the product formed by the reagent and this substance, or which in some other manner disguise the true concentration of the constituent being analyzed. Their influence is erratic, unpredictable, and otherwise undesirable, and the problem they create is particularly acute with regard to industrial waters on which continuous, automatic sampling and analysis are desired.

I have invented methods and apparatus for so analyzing a continuous flowing sample as to be rid of all deleterious effects caused by the presence of interfering substances. My invention is applicable to any aqueous sample for which is desired a continuous analysis of a volatile substance or one which may be rendered volatile at a practical temperature through the addition of a suitable acid, base, or other substance. By a volatile substance, I mean one which will vaporize at a rate exceeding or approaching the rate of vaporization of the solvent in which it is present when the temperature of the solution is equal to or exceeds the boiling point of the solvent. In many cases of practical application, this disclosure includes as volatile substances those substances which, when present as solutes in water, require the addition of a third substance to elevate the boiling point of the solution in order to vaporize the solute at a rate comparable to that of the water.

My invention comprises in its preferred apparatus form means for delivering a liquid sample together with a suitable acidic or basic additive at predetermined flow rates to a heating chamber, introducing heat to the heating chamber at a predetermined rate, removing heated sample from the heating chamber at a rate which is a predetermined fraction of the inflow rate of the sample, condensing the vapors given off in the heating chamber and collecting the condensate thereof, analyzing the condensate for content of the volatile substance, and multiplying the result by a predetermined factor representing the partition of the volatile substance between the condensed vapor and the blowdown.

In a broader aspect, my method invention comprises the steps of continuously sampling, continuously distilling a controlled portion of the sample, and analyzing the condensate either continuously or periodically.

The apparatus invention will be explained in detail with reference to FIGURE 1. FIG. 1 depicts a presently preferred form of my invention showing sample inlet means, a heating chamber, blowdown means, and condensing means.

In FIG. 1, sample source tube 1 is positioned to inject liquid sample containing a suitable acidic or basic reagent from source tube 2 into vertical inlet tube 3, which is connected to the base of heating chamber 5. S-drain 7 is preferably connected to heating chamber 5 near the base of expansion bulb 9, which forms the upper portion of heating chamber 5. Vapor exit 11 is preferably taken from the upper portion of expansion bulb 9. Quartz heater 13 is fixed in position by stopper 15 and is provided with electrical cord 17 leading through voltage regulator 23 to a standard plug. Vapor exit 11 runs the condenser 19 having a collector 21.

Operation of the apparatus is as follows: Aqueous sample containing an unknown quantity of volatile substance is first treated by continuously adding a small amount of a suitable acidic reagent chosen according to standard analytical procedures. The sample is then introduced through sample source tube 1 into vertical inlet tube 3, preferably at a rate of about 12–16 ml. per minute in the case of phenol, for example. The flow rate should be as steady as possible and is preferably regulated by a peristaltic pump of the type described in U.S. Patent No. 2,546,852. Since vertical inlet tube 3 is operatively connected through connector tube 4 to heating chamber 5, the level in each is always the same. Heating chamber 5 becomes filled to the level of the opening to S-drain 7, but cannot exceed this level except by agitation from boiling. Heat is introduced into heating chamber 5 by quartz heater 13 at a constant rate. The rate of heat input is a predetermined quantity on which the rate of drain, or blowdown, depends. If the sample flow and heat input are constant, the blowdown flow will also be constant. The vaporized fraction of the sample passes through vapor exit 11 and into condenser 19 where it is fully condensed. It is then collected in collector 21 and conveyed to a separate device or container for batch or continuous analysis.

My invention is designed particularly for continuous analysis. In the preferred apparatus, the condensate may be conveyed from collector 21 by a second peristaltic pump such as that described in U.S. Patent No. 2,546,852 and the proper reagent or reagents continuously admixed therewith by a device such as is disclosed by Platte et al. in U.S. patent application Serial No. 82,992, filed January 16, 1961, now U.S. Patent No. 3,128,993, issued April 14, 1964. After any necessary reaction delay period, the treated condensate may then be conducted to a continuous colorimetric analyzer such as that disclosed by Luppold et al. in U.S. patent application Serial No. 861,589, filed December 23, 1959, utilizing a sample cell such as that described in U.S. patent application Serial No. 850,669 of the inventor herein, filed November 3, 1959, now abandoned.

The immediate result of the analysis will be in terms of the content of volatile substance in the condensate. It is an important characteristic of my invention that, regardless of a varying concentration of volatile substance in the sample, the fraction or percent of volatile substance from the sample which is carried over with the condensate is a constant. That is, a constant percentage of total volatile substance is boiled off together with a constant portion of solvent. The value of the constant in any particular case depends upon predetermined constant rates of heat input and sample flow, and also upon the constant heating chamber volume. For most industrial uses, the constant is perhaps best expressed as a fraction in which the numerator is the concentration of volatile substance in the sample in parts per million and the denominator is the concentration in like terms of the volatile substance in the condensate.

When the immediate analytical result as to the condensate is multiplied by the above-mentioned constant, the correct result for analysis of the sample is obtained. For example, if there are 3 p.p.m. of phenol in the sample, there may be foun din the condensate 4 p.p.m. of phenol, or a fraction of ¾. Given a constant rate of heat input and sample flow into the same heating chamber, the concentration ratio will remain at ¾, although the concentration of phenol in the sample may vary. Thus, a variable concentration of phenol in a continuous sample may in this case be found at any time by multiplying the current condensate analysis by 0.75, the sample-condensate concentration ratio. This multiplication may be performed mentally or by mechanical linkages such as recorder pen linkages or by using electrical, pneumatic, or other control signals in a known manner.

As mentioned above, the constant sample-condensate concentration ratio is obtained only when certain other factors are held constant. The heat input rate may be held constant by using a voltage regulator on the quartz heater. The sample flow may be held constant by the use of a peristaltic pump, as mentioned elsewhere. Because of slight variations in heating chamber volume, it is preferred to calibrate each unit by actual test. Other means of standardizing the units and maintaining constant flow rates and heat input will no doubt occur to those familiar with the art.

The sample-condensate concentration ratio will never be less than unity so long as the volatile substance under study is truly volatile, i.e., more volatile than the aqueous sample medium. This fact provides an additional advantage to my invention. It means that, generally speaking, and especially where the volatile substance concentration in the sample is low, or where it is likely to vary only over a relatively small range, the analyzer is able to achieve better results because of the increased concentration in the condensate which provides in effect a proportionately large sample which may be subject to a smaller error in a colorimeter or other analytical means.

I have found that, in the case of the presently preferred apparatus having a heating chamber volume of 2.65 cubic inches and a sample introduction rate of 15 ml./min., a desirable rate of heat introduction is about 322 watts. That is, at a power of 322 watts the apparatus will continuously evaporate about 9 ml./min. of a typical phenol-containing industrial water, while 6 ml./min. will be permitted to drain. Practically no carryover of interfering substances occurs within this range.

Of course, the heat input should be sufficient to elevate the sample temperature to the boiling point of the mixture. However, I do not intend to be limited to any range of power, temperature, sample flow or other factor. So long as the combination of power, heating chamber volume, sample flow, and sample temperature prior to introduction, are such that a constant partition is maintained between sample and condensate, the device or method is within the scope of my invention. Preferably, in the case of phenol, at least about ¼ of the sample flow should be blown down from the heating chamber, in order to practically eliminate carryover of interfering substances although considerably lower limits may be used. In the case of fluoride analysis, a safe blowdown rate may be as little as 15–20% or even less. The upper limit of blowdown rate is set only by the desired efficiency.

It may be apparent to those skilled in the art that the S-drain 7 should always be blocked by at least some fluid, in order to prevent the erratic escape of vapors through the S-drain. In the configuration shown, the S-drain is always blocked by at least some liquid. It is not necessary that the liquid level in the heating chamber be as high as the S-drain orifice; it may be somewhat lower so long as the turbulence caused by boiling continuously causes liquid to be propelled into the drain orifice at a constant rate.

Although the S-drain is preferred, other types of drains may be used. For example, a relatively straight downward projecting drain may be used, provided its lower extremity terminates in a vessel of liquid or other medium to prevent the erratic escape of vapors. Other types of drains, possibly including simple valves, may occur to those skilled in the art. It is essential that the drain be of such nature as to permit continuous blowdown at the desired rate while blocking the irregular passage of vapors. A particular advantage of the drain shown is that it requires no adjustment whatever and will drain at a rate dependent only upon power input and sample flow.

The quartz heater which is presently preferred is the "Glo-Quartz" immersion heater fully described on page 561 of "Modern Laboratory Appliances," Fisher Scientific Company, 1961. This heater has a relatively short warm-up time, and, so long as a voltage regulator is utilized on its power supply, will introduce heat at a constant rate. Its efficiency should be checked periodically, however, since the desired steady partition coefficient is dependent upon the steady introduction of energy. Any heater may be used which is capable of introducing heat energy to the heating chamber at the desired rate. It need not necessarily be on the inside of the heating chamber, but may be in the form of a heating jacket, for example.

The success and efficiency of my invention is demonstrated in the following tables.

In Table I results are presented of a demonstration of my invention in which the preferred heating chamber of 2.65 cubic inches was utilized. About two liters of an aqueous solution containing phenol was fed in the preferred manner to the heating chamber together with phosphoric acid. The heater was kept operating at a constant rate by use of a voltage regulator. The distillate was collected in 50 milliliter portions and the absorbance was recorded after a standard colorimetric procedure using a Bausch and Lomb "Spectronic 20."

TABLE I

*Variation in Rate of Distillation of Phenol*

| Fraction collected (50 ml. portions): | Absorbance |
|---|---|
| No. 1 | 0.48 |
| No. 2 | 0.45 |
| No. 3 | 0.46 |
| No. 4 | 0.48 |
| No. 5 | 0.48 |
| No. 6 | 0.48 |
| No. 7 | 0.47 |
| No. 8 | 0.45 |
| No. 9 | 0.49 |
| No. 10 | 0.47 |
| No. 11 | 0.45 |
| No. 12 | 0.48 |
| No. 13 | 0.45 |
| No. 14 | 0.45 |
| Average | 0.47 |

Table II demonstrates that the rate of distillation is independent of the concentration in the sample. Enrichment of phenol in the distillate is due to the fact that a sample inflow rate of 16 ml./min. was used while the heater was adjusted to boil off 6–7 ml./min.

TABLE II

*Variation in Rate of Distillation of Phenol at Various Concentration Levels*

| Phenol in Sample, p.p.m. | Phenol Found, p.p.m. | Ratio, Phenol in Sample ÷ Phenol Found |
|---|---|---|
| 1.00 | 1.33 | 0.75 |
| 1.06 | 1.40 | 0.76 |
| 2.12 | 2.94 | 0.72 |
| 3.36 | 4.54 | 0.74 |
| 5.42 | 7.36 | 0.74 |
|  |  | [1] 0.74 |

[1] Average.

Table III shows that a sample-condensate concentration ratio may exceed unity in the case of a substance such as fluoride, which requires the addition of relatively large amounts of acid to achieve the optimum boiling temperature. In this case, sulfuric acid was added to the heating chamber along with the sample, but it was considered impracticable to add the amount necessary to achieve a sample-condensate ratio higher than unity because of possible damage to the tubing, for economic reasons, and because of the possibility that some of the sulfuric acid would be carried over. All factors considered, an optimum rate of addition of sulfuric acid is 1½ ml./min. of 30% sulfuric acid when a sample flow of 6 ml./min. is maintained. As may be seen below, a recovery of 89% of the fluoride is obtained.

TABLE III

*Recovery of Fluoride*

| Amount in Sample, p.p.m. | Amount Found with Distillation, p.p.m. | Recovered, percent |
|---|---|---|
| 0.5 | 0.46 | 92 |
| 0.7 | 0.62 | 89 |
| 1.0 | 0.88 | 88 |
| 1.0 | 0.90 | 90 |
| 1.1 | 1.00 | 90 |
| 1.4 | 1.25 | 89 |
| 1.5 | 1.32 | 88 |

In the example of Table III, the constant flow rates of 1½ ml./min. for the 30% sulfuric acid and 6 ml./min. for the sample result in a 6 mole concentration of sulfuric acid entering the heating chamber. The molar concentration multiplied by the ebullioscopic constant for water (0.52), indicates that the boiling point of the solution is effectively elevated only by about three degrees centigrade. However, the concentration of sulfuric acid in the blowdown is about 50%, or 36 moles. Thus, it may be surmised that at the boiling site, the boiling point has been raised approximately 0.52×36 or 18.7 degrees. The validity of the use of the ebullioscopic constant is questionable, since it is based on calculations for dilute solutions; in any event, the difficulty of measuring the temperature of the solution renders any discussion of the exact effect of the sulfuric acid on the boiling point highly theoretical, and I do not intend to be bound by any theories. It may be said, however, that in the case of some otherwise nonvolatile substances such as fluoride as discussed above, it is necessary to add a suitable reagent to elevate the boiling point of the solution to the range in which a sufficiently concentrated condensate may be obtained.

In the usual sense, a volatile substance is one which, when present as a solute in a solvent, will raise the vapor pressure and lower the boiling point of the solution below that of the pure solvent. I also mean to include in the scope of this disclosure as volatile substances those substances which, through the addition of certain nonvolatile substances to the solvent for the purpose of raising the boiling point thereof, may be made to distill at a rate approaching or exceeding that of the solvent. For example, the addition of phosphoric acid to a phenol-containing sample enables me to distill phenol at a higher rate than its solvent, water. In the case of fluoride, the addition of sulfuric acid raises the boiling point of the water to a level where the rate of distillation of fluoride is practical, although it does not necessarily exceed that of the solvent. I mean to include as volatile substances both types of compounds.

Whereas, an aqueous fluoride sample may be distilled in the presence of sulfuric acid, and phenol in the presence of phosphoric acid as stated above, ammonia may be distilled in the presence of a phosphate buffer solution, while cyanide also may require the use of sulfuric acid. See, for examples of such standard analytical procedures, "Standard Methods for the Examination of Water and Waste Water," eleventh edition, 1960, published jointly by the American Public Health Association, American Water Works Association, and Water Pollution Control Federation. I do not intend to be bound by any presently standard method of elevating the sample boiling point but may use any substance or method which will accomplish this result.

There are some interfering substances which may be carried over in the distillation procedure unless additional reagents are mixed with the sample. For example, some sulfur-containing waters may produce $H_2S$ which will be carried over unless the sulfur is removed. I prefer to remove the sulfur by adding a small amount of copper sulfate solution to the sample in the same manner as the acidic or basic reagent. Chlorine may be inactivated by the addition of sodium arsenate. In the former case, the interfering substance is carried into the blowdown in the form of a precipitate. In the latter case, it passes through the blowdown in an inactive state.

I do not intend to be bound by the illustrative methods and apparatus described herein. My invention may be otherwise practiced and embodied within the scope of the following claim.

I claim:

Method of quantitative analysis for a volatile substance in an aqueous medium comprising:
  (a) continuously sampling said aqueous medium,
  (b) continuously simultaneously
    (i) passing the sample thus obtained at a constant predetermined inflow rate to a heating chamber,
    (ii) passing a boiling point elevating substance into said heating chamber at a constant predetermined inflow rate,
    (iii) introducing heat into said chamber at a constant rate sufficient to elevate and maintain the temperature therein at about the boiling point of the solution so that at least a portion of the volatile substance is vaporized,
    (iv) removing a portion of heated sample at a constant flow rate which is a predetermined fraction of said sample inflow rate, whereby to maintain a substantially constant level of sample therein and prevent buildup of dissolved solids therein, (v) condensing the vapors from the heating chamber and collecting the condensate thus formed, and (c) analyzing the condensate.

References Cited in the file of this patent

UNITED STATES PATENTS

| | | |
|---|---|---|
| 1,672,948 | Legeler | June 12, 1928 |
| 1,805,559 | Barbet | May 19, 1931 |
| 2,086,808 | Kallam | July 13, 1937 |
| 2,630,735 | Rouy | Mar. 10, 1953 |

OTHER REFERENCES

Thatcher et al.: Analytical Chemistry, volume 31, No. 4, pages 776–789 (April 1959).

ASTM Standards, D1426–58, Part 10, pages 1211–1216 (1958).

Weissberger: Distillation, pages 295–96 (1951), Interscience Publishers, Inc., N.Y.

UNITED STATES PATENT OFFICE
CERTIFICATE OF CORRECTION

Patent No. 3,147,082　　　　　　　　　　　　September 1, 1964

Ralph N. Thompson

It is hereby certified that error appears in the above numbered patent requiring correction and that the said Letters Patent should read as corrected below.

Column 2, line 21, for "the" read -- to --.

Signed and sealed this 26th day of January 1965.

(SEAL)
Attest:

ERNEST W. SWIDER　　　　　　　　　　　　EDWARD J. BRENNER
Attesting Officer　　　　　　　　　　　　Commissioner of Patents